US007123586B1

(12) United States Patent
Cook

(10) Patent No.: US 7,123,586 B1
(45) Date of Patent: Oct. 17, 2006

(54) BANDWIDTH SHARING BETWEEN DEVICES IN A COMMUNICATION SYSTEM

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 830 days.

(21) Appl. No.: 09/943,281

(22) Filed: Aug. 30, 2001

(51) Int. Cl.
- G01R 31/08 (2006.01)
- H04J 3/16 (2006.01)
- H04L 12/66 (2006.01)

(52) U.S. Cl. .............. 370/237; 370/437; 370/468; 370/352

(58) Field of Classification Search .............. None
See application file for complete search history.

(56) References Cited

U.S. PATENT DOCUMENTS

| | | | | |
|---|---|---|---|---|
| 4,397,030 A | * | 8/1983 | Becker et al. | 375/257 |
| 5,025,497 A | * | 6/1991 | Yoshiura | 358/425 |
| 5,539,729 A | * | 7/1996 | Bodnar | 370/232 |
| 6,157,614 A | * | 12/2000 | Pasternak et al. | 370/236 |
| 6,157,648 A | * | 12/2000 | Voit et al. | 370/401 |
| 6,289,010 B1 | * | 9/2001 | Voit et al. | 370/352 |
| 6,298,373 B1 | * | 10/2001 | Burns et al. | 709/203 |

* cited by examiner

*Primary Examiner*—Chau Nguyen
*Assistant Examiner*—Cynthia L. Davis

(57) ABSTRACT

A communication system that provides link sharing between communication devices within the system. A first communication device communicates with the service provider over a first link and a second communication device communicates with the service provider over a second link. The second communication device determines a need for additional bandwidth and transmits a request for the additional bandwidth. The second communication device receives an instruction message responsive to the request that grants the second communication device access to available bandwidth on the first link. The second communication device then communicates with the service provider over a third link and the first link at the available bandwidth wherein the third link connects the second communication device and the first communication device.

55 Claims, 5 Drawing Sheets

BANDWIDTH SHARING BETWEEN DEVICES IN A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to bandwidth sharing between communication devices within a communication system.

2. Description of the Prior Art

High-bandwidth communications are becoming customary for both businesses and residences. Customers are requesting more bandwidth from service providers to satisfy their communication needs. Thus, service providers are continually searching for methods and systems to supply the higher bandwidths to their customers.

One way to provide high bandwidth is with high-bandwidth links, such as Digital Subscriber Line (DSL) service links, ISDN service links, and satellite links. Even though these service links provide a high bandwidth to the customer, the customer may require an even higher bandwidth than these service links can provide.

One method of providing more bandwidth to the customer is to provide multiple links between the service provider and the customer. For example, the service provider could set up two Public Switched Telephone Network (PSTN) links with the customer. A communication device located at the customer premises bonds the data received over the two PSTN links to provide increased bandwidth. Alternatively, the service provider could set up a PSTN link and a satellite link. Unfortunately, the communication device at the customer premises may have a difficult time bonding data received over different types of links.

Another problem is that communication systems are not utilizing the full capacity of their resources. For example, while a first customer may require an increased bandwidth, a second customer may have bandwidth that is not being fully utilized. The bandwidth available to the second customer is being wasted, and consequently, the service provider is not operating at maximum capacity. Unfortunately, current communication systems have not been effectively adapted to utilize the available bandwidth provided to its customers.

SUMMARY OF THE INVENTION

The invention helps to solve the above problems with a system, method, and software of sharing bandwidth between communication devices in a communication system. The invention advantageously increases the bandwidth available to customers without the cost of installing multiple communication links. The invention also allows service providers to operate at an increased efficiency.

One example of the invention comprises a communication system comprised of a service provider, a first communication device, and a second communication device. The first communication device is configured to communicate with the service provider over a first link. The second communication device is configured to communicate with the service provider over a second link. The second communication device is configured to determine a need for additional bandwidth. The second communication device is configured to transmit a request for the additional bandwidth. In some examples, the second communication device is configured to transmit the request to the service provider. In other examples, the second communication device is configured to transmit the request to the first communication device. The second communication device is configured to receive an instruction message responsive to the request. The instruction message grants the second communication device access to available bandwidth of the first link. The second communication device is then configured to communicate with the service provider over a third link and the first link at the available bandwidth, wherein the third link connects the second communication device and the first communication device.

In another example of the invention, the first communication device is again configured to communicate with the service provider over a first link. The second communication device is configured to communicate with the service provider over a second link. The service provider is configured to determine a need to provide additional bandwidth to the second communication device. The service provider determines the available bandwidth on the first link. The service provider generates and transmits an instruction message to the second communication device responsive to the determination of the available bandwidth. The instruction message grants the second communication device access to available bandwidth on the first link. The second communication device is then configured to communicate with the service provider over a third link and the first link at the available bandwidth, wherein the third link connects the second communication device and the first communication device.

Another example of the invention comprises a communication system comprised of a central office and a Local Area Network (LAN). The LAN is comprised of multiple customer premises devices connected to the central office by links. Each customer registers a link with the central office and advertises any additional bandwidth. If any of the customer premises devices has additional bandwidth on their link, then they generate a link sharing contract and transmit the contract to the central office. If one of the customer premises devices requests additional bandwidth, then the requesting customer communicates with the central office to set up a link with the customer that has the additional bandwidth. The requesting customer premises device then communicates with the central office over the additional bandwidth.

DETAILED DESCRIPTION OF THE INVENTION

Figure 1:
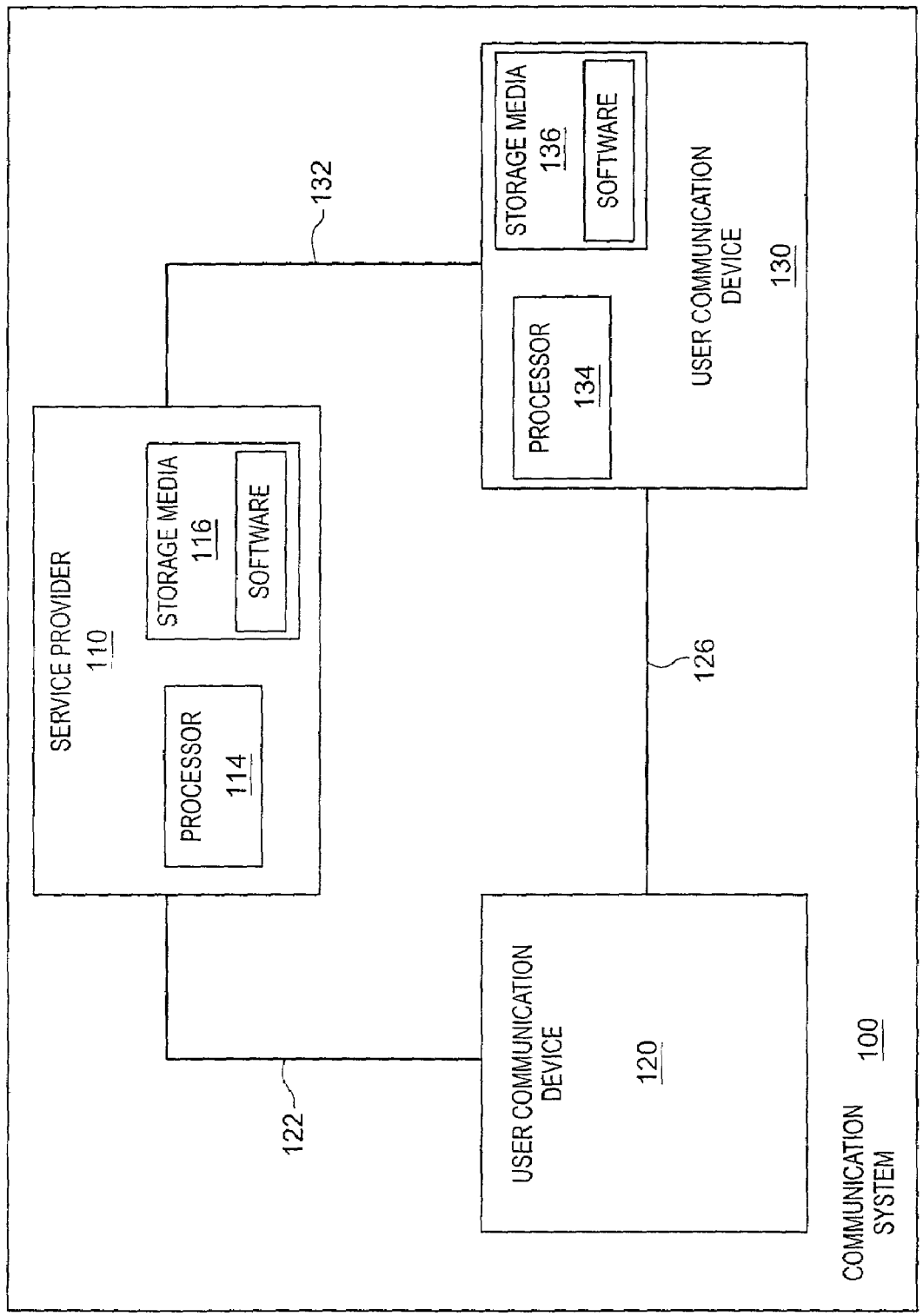
FIG. 1 is a block diagram that illustrates a communication system in an example of the invention.
Figure 2:
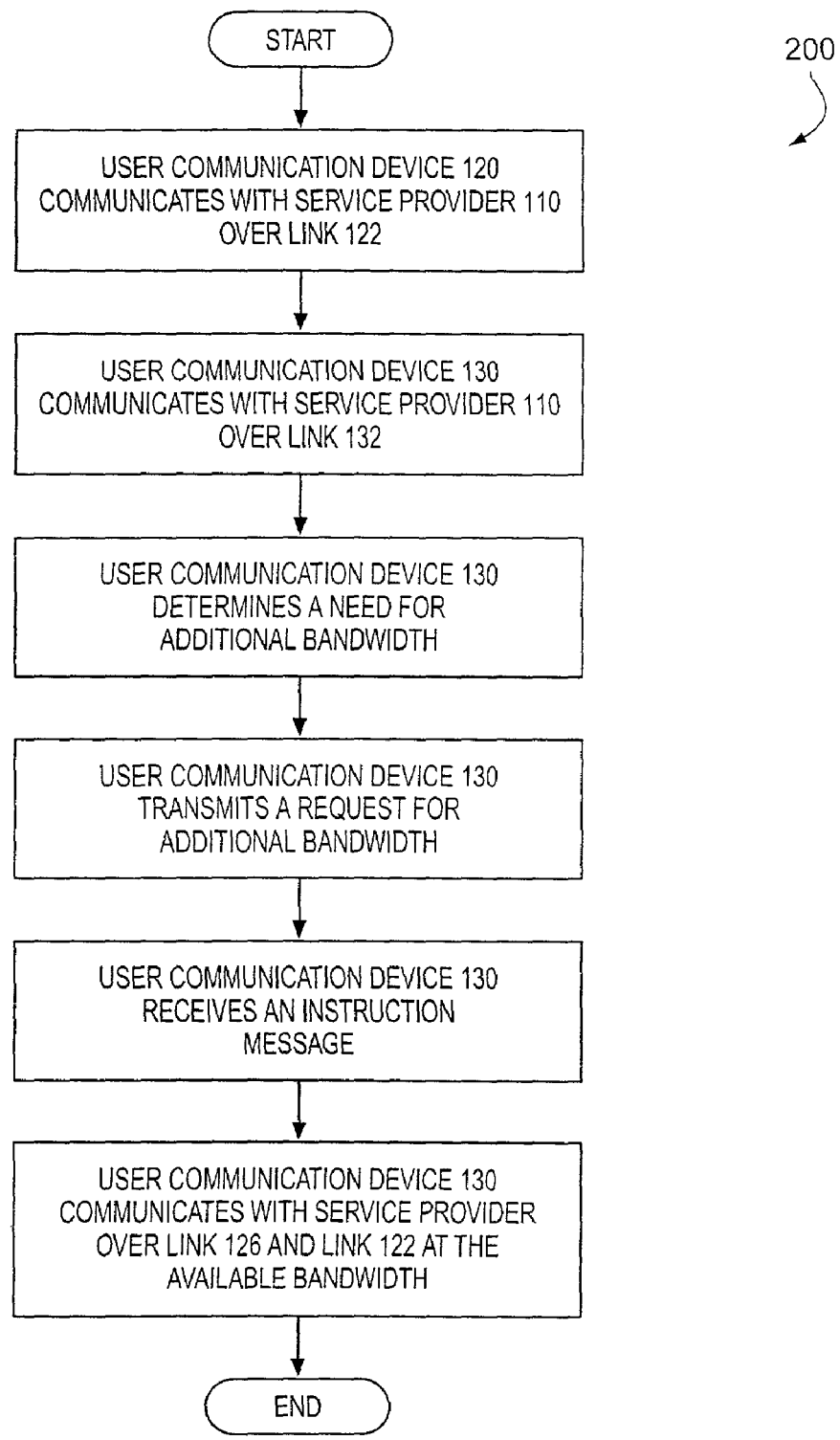
FIG. 2 is a flow diagram that illustrates a process executed by the communication system in FIG. 1 in an example of the invention.
Figure 3:
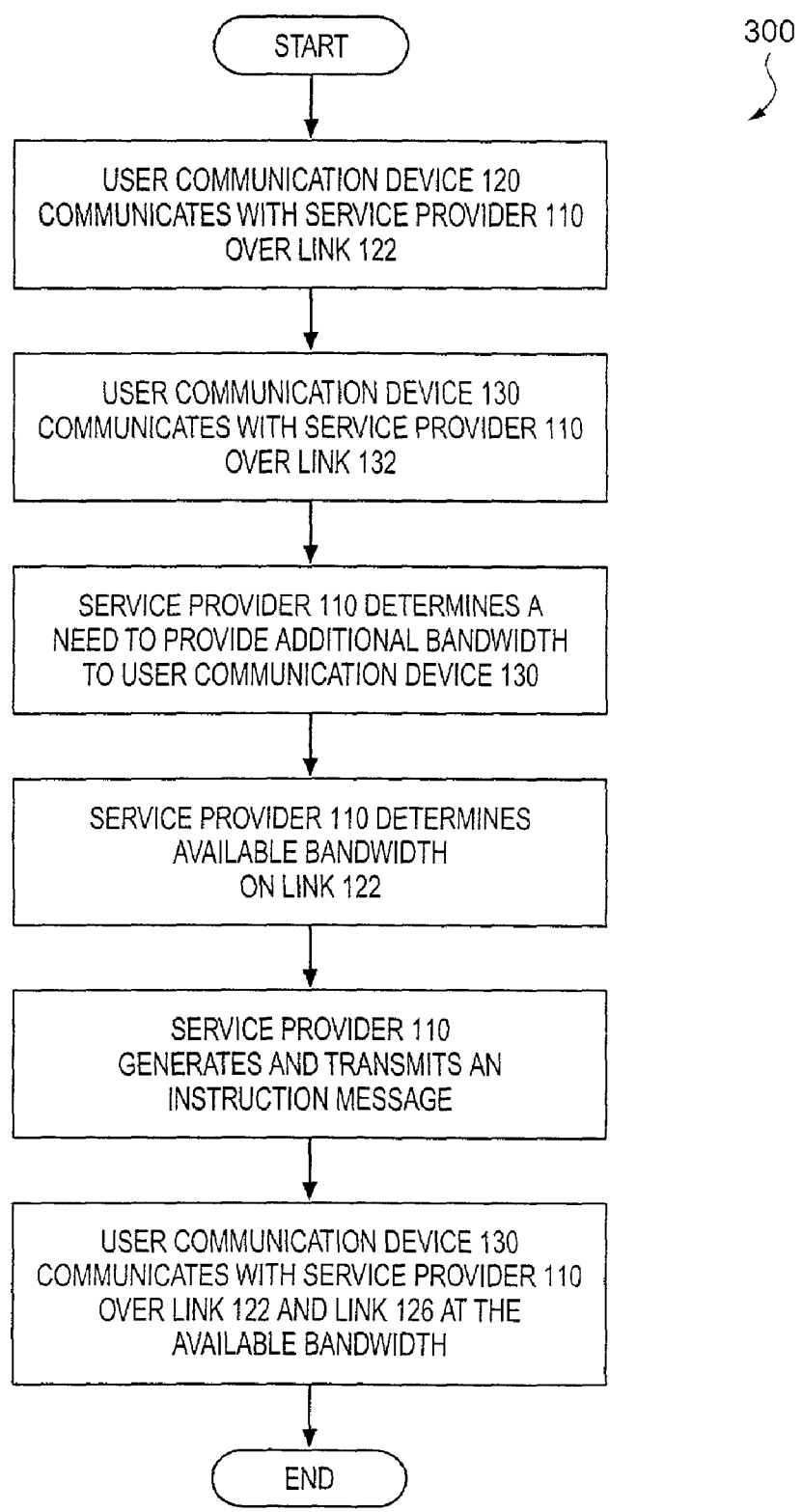
FIG. 3 is a flow diagram that illustrates a process executed by the communication system in FIG. 1 in an example of the invention.

A Communication System—FIGS. 1–3

FIGS. 1–3 depict specific examples of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1–3 have been simplified or omitted for clarity.

FIG. 1 illustrates a communication system 100 in an example of the invention. Communication system 100 is comprised of a service provider 110, a user communication device 120, and a user communication device 130. User communication device 120 is configured to communicate with service provider 110 over a link 122. User communication device 130 is configured to communicate with service provider 110 over a link 132. User communication device 130 can be configured to communicate with user communication device 120 over a link 126. In some examples, user communication device 130 can be dynamically configured to communicate with user communication device 120 over link 126.

A service provider is any system configured to supply communications. Some examples of a service provider include an Internet Service Provider (ISP) and a central office of a Public Switched Telephone Network (PSTN). A user communication device is any device used to communicate with a service provider. One example of a communication device is a computer with a communication modem. A link is any communication path, including wire line links and wireless links. Bandwidth refers to the capacity of communications.

FIG. 2 illustrates a process 200 executed by communication system 100 in an example of the invention. To start, user communication device 120 communicates with service provider 110 over link 122. User communication device 130 communicates with service provider 110 over link 132. User communication device 130 determines a need for additional bandwidth. User communication device 130 transmits a request for the additional bandwidth. In some examples, user communication device 130 transmits the request to service provider 110. In other examples, user communication device 130 transmits the request to user communication device 120 or any other user communication device within communication system 100.

User communication device 130 receives an instruction message responsive to the request. The instruction message grants user communication device 130 access to available bandwidth on link 122. User communication device 130 communicates with service provider 110 over link 126 and link 122 at the available bandwidth.

In some examples, user communication device 130 establishes link 126 with user communication device 120 responsive to the instruction message. In other examples, link 126 is already established between user communication device 130 and user communication device 120. Those skilled in the art will appreciate that user communication device 130 could communicate with service provider 110 over link 132 simultaneously as it communicates with service provider 110 over link 126 and link 122.

Those skilled in the art will appreciate that the above-described operation of user communication device 130 could be performed by instructions, stored on storage media 136, that are executed by a processor 134. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

FIG. 3 illustrates a process 300 executed by communication system 100 in an example of the invention. To start, user communication device 120 communicates with service provider 110 over link 122. User communication device 130 communicates with service provider 110 over link 132. Service provider 110 determines a need to provide additional bandwidth to user communication device 130. Service provider 110 determines an available bandwidth on link 122. Service provider 110 then generates and transmits an instruction message responsive to the determination of the additional bandwidth on link 122. The instruction message grants user communication device 130 access to the available bandwidth on link 122.

User communication device 130 receives the instruction message. User communication device 130 communicates with service provider 110 over link 126 and link 122 at the available bandwidth responsive to the instruction message.

Those skilled in the art will appreciate that the above-described operation of service provider 110 could be performed by instructions, stored on storage media 116, that are executed by a processor 114. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 4:
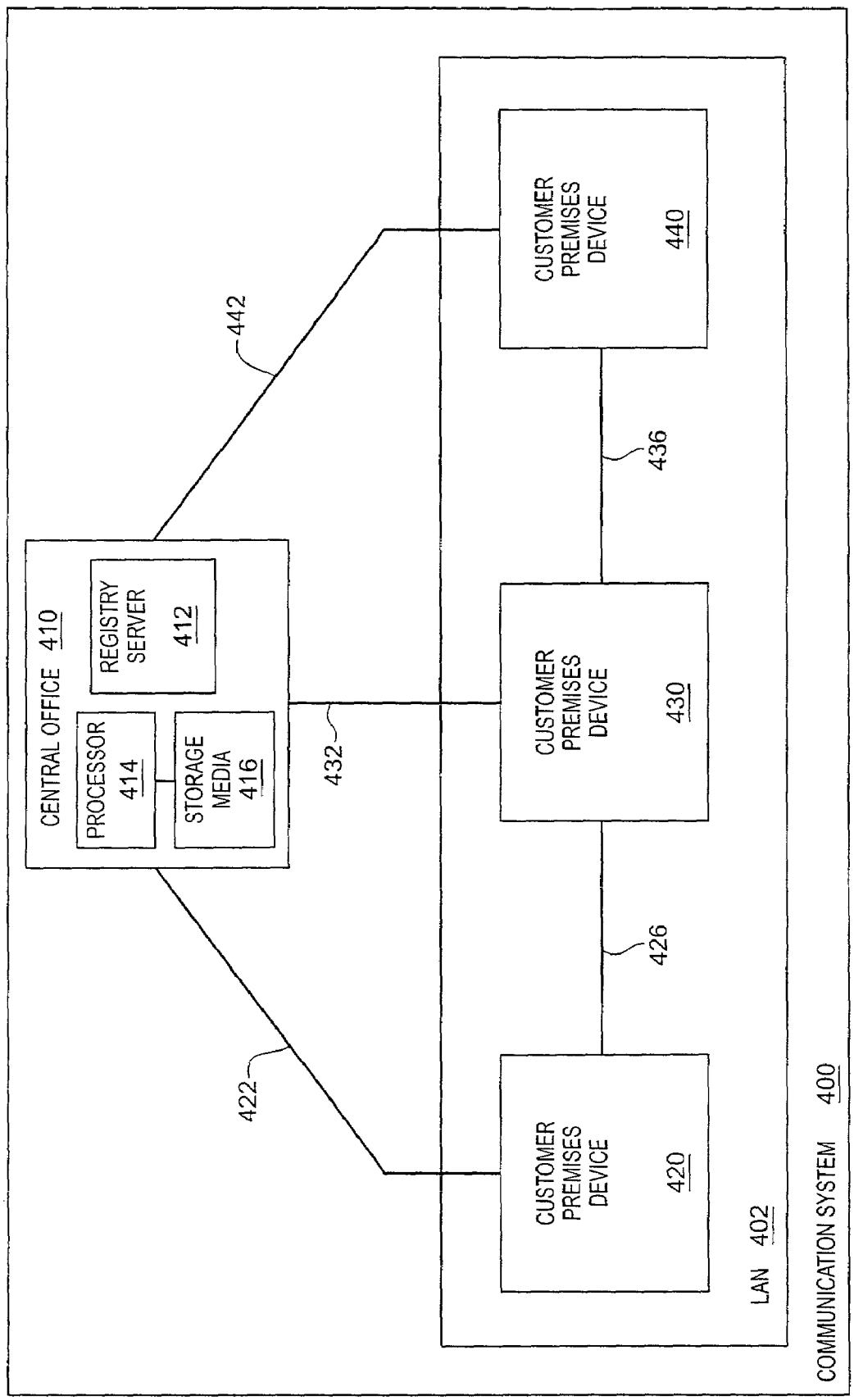
FIG. 4 is a block diagram that illustrates a communication system comprised of a Local Area Network connected to a Central Office in an example of the invention.
Figure 5:
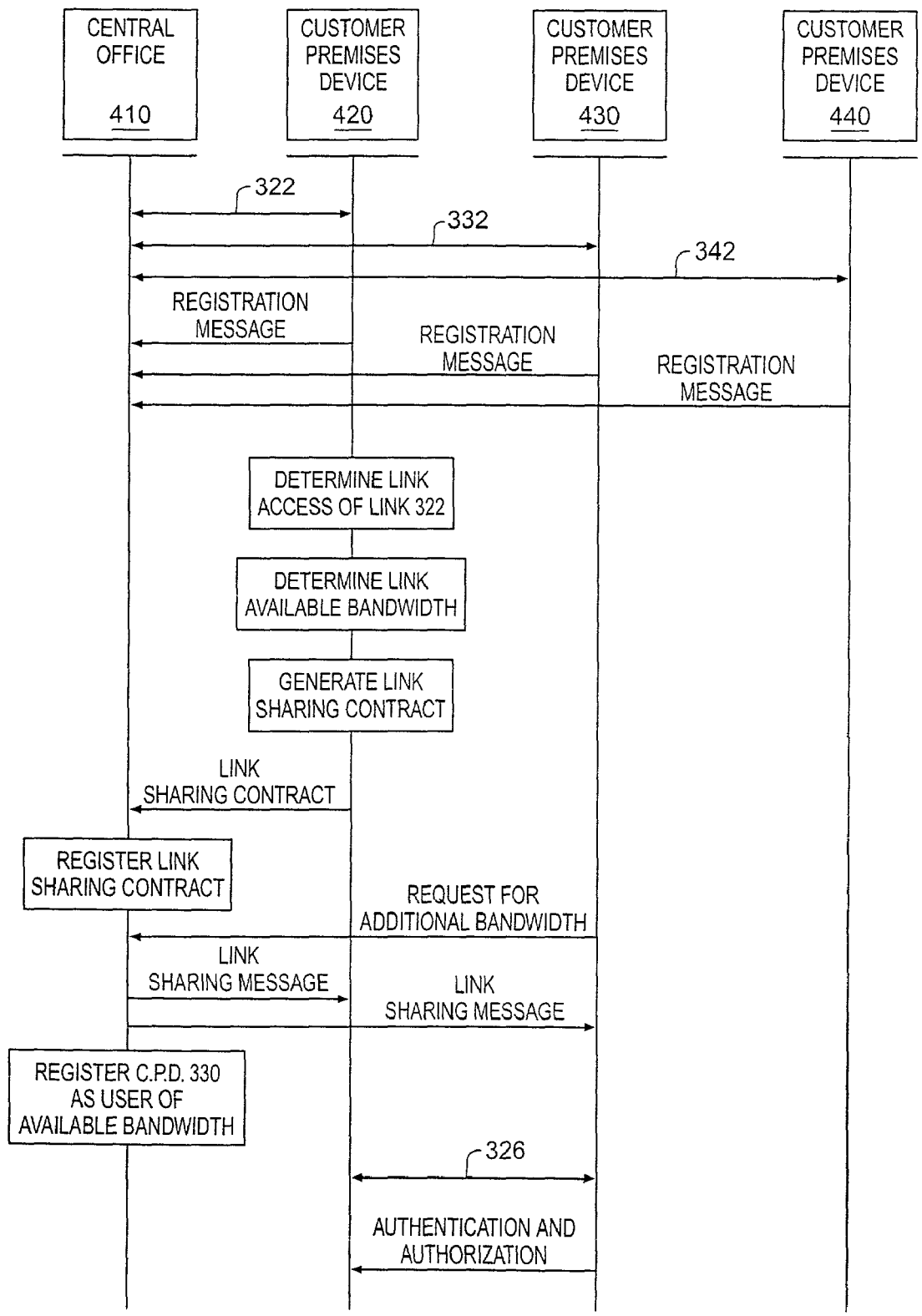
FIG. 5 is a communication diagram that illustrates communication messages in the communication system in FIG. 4 in an example of the invention.

A Communication System that Includes a LAN—FIGS. 4–5

FIGS. 4–5 depict a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 4–5 have been simplified or omitted for clarity.

FIG. 4 illustrates a communication system 400 in an example of the invention. Communication system 400 is comprised of a central office 410 and a Local Area Network (LAN) 402. Central office 410 is comprised of a registry server 412, a processor 414, and a storage media 416. LAN 402 is comprised of customer premises devices 420, 430, and 440. Customer premises device 420 is configured to communicate with central office 410 over link 422. Customer premises device 430 is configured to communicate with central office 410 over link 432. Customer premises device 440 is configured to communicate with central office 410 over link 442. Customer premises device 420 is configured to communicate with customer premises device 430 over link 426. Customer premises device 430 is configured to communicate with customer premises device 440 over link 436.

Communication system 400 is a Wide Area Network (WAN). LAN 402 is a campus network, a neighborhood network, or any other local network. Customer premises devices 420, 430, and 440 are communication devices located at residences, businesses, or any other entity that receives communications. Links 422, 432, and 442 are DSL service links, ISDN service links, T-1 service links, or any other type of service links. Links 426 and 436 are localized links such as a 900 MHz link, an infrared link, Bluetooth, a dedicated wire, or any other wireless or wire line link.

FIG. 5 is a diagram that illustrates processes executed by, and communications within, communication system 400. To begin, customer premises devices 420, 430, and 440 communicate with central office 410 over links 422, 432, and 442, respectively. For this example, links 422, 432, and 442 are DSL service links that have a 1.5 Mbps bandwidth. Customer premises device 420 determines the capacity of link 422. Customer premises device 420 transmits a registration message to central office 410 to register link 422 with central office 410. Customer premises device 430 determines the capacity of link 432. Customer premises device 430 transmits a registration message to central office 410 to register link 432 with central office 410. Customer premises device 440 determines the capacity of link 442. Customer premises device 440 transmits a registration message to central office 410 to register link 442 with central office 410. Central office 410 receives the registration messages from customer premises devices 420, 430, and 440. Central office 410 registers links 422, 432, and 442 in registry server 412.

Customer premises device 420 then determines a link access of link 422 by determining whether use of link 422 is for private use or for discretionary use. Discretionary use means that the bandwidth of link 422 is not required all of the time by customer premises device 420, and may be available for link sharing. If link 422 is for discretionary use, then customer premises device 420 determines the amount of available bandwidth on link 422 beyond the bandwidth that customer premises device 420 uses for communications. For this example, assume that customer premises device 420 uses 0.5 Mbps of bandwidth. Customer premises device 420 then generates a link sharing contract based on the available bandwidth. The link sharing contract indicates the 0.5 Mbps of bandwidth available on link 422. Customer premises device 420 transmits the link sharing contract to central office 410. Central office 410 registers the link sharing contract and the available bandwidth of link 422 in registry server 412. Those skilled in the art will appreciate that customer premises device 420 could advertise the available bandwidth, on link 422, to customer premises devices 430 and 440. For example, customer premises device 420 could transmit a wireless signal that advertises the available bandwidth.

The link sharing contract specifies the type of use allowed for the available bandwidth on link 422. For example, the link sharing contract specifies whether the use is interruptible, non-interruptible, interruptible with notice, or interruptible with user permission. The link sharing contract also specifies how customer premises device 420 wants link 422 identified to other customer premises devices, how customer premises devices are to be authenticated and authorized for link sharing, whether link 422 is to be shared for a deterministic time frame, how link interruption is signaled, whether link 422 is secure, and whether a usage record is to be generated for link sharing.

For this example, assume that customer premises device 430 requires 2.0 Mbps of bandwidth, which is more than is available over link 432. Customer premises device 430 then transmits a request for additional bandwidth to central office 410. Responsive to the request, central office 410 searches in registry server 412 for links, within LAN 402, that have available bandwidth. Central office 410 determines that link 422 has 0.5 Mbps of available bandwidth. Central office 410 transmits a link sharing reply message to customer premises device 420 and customer premises device 430. Central office 410 registers customer premises device 430 in registry server 412 as the user of the available bandwidth of link 422 for a specified period of time.

Responsive to the link sharing reply message, customer premises device 430 and customer premises device 420 set up sharing link 426. Customer premises device 430 transmits authentication and authorization information to customer premises device 420 over link 426. Customer premises device 430 could also transmit encryption information and proximity information to customer premises device 420. Central office 410, customer premises device 420, and/or customer premises device 430 can monitor the performance of the sharing link 426, such as by determining the error rate, latency, and jitter of the sharing link 426. Customer premises device 430 then communicates with central office 410 over link 432 at 1.5 Mbps of bandwidth and over link 426 and link 422 at 0.5 Mbps of bandwidth. By sharing link 422 with customer premises device 420, customer premises device 430 is able to communicate with central office 410 at 2.0 Mbps.

After the period of time for customer premises device 430 to share link 422 is up, central office 410 registers link 422 as available in registry server 412. Central office 410 updates the usage record in the link sharing contract. Central office 410 then bills the user of customer premises device 430 and the user of customer premises device 420 based on the link sharing contract.

The above-described operation could be used to provide sharing links between a first LAN and a second LAN. The above-described operation could also be used to provide sharing links between a campus-based Personal Communications Service (PCS) system and another campus-based system or the public network.

The above-described operation of customer premises devices 420, 430, and 440 and central office 410 could be performed by instructions, stored on storage media, that are executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A communication system configured to provide bandwidth sharing, the communication system comprising:
a service provider;
a first user communication device configured to communicate with the service provider over a first link; and
a second user communication device configured to communicate with the service provider over a second link, wherein the second link does not include the first user communication device and wherein the first link does not include the second user communication device, determine a need for additional bandwidth and transmit a request for the additional bandwidth, receive an instruction message responsive to the request that grants the second user communication device access to available bandwidth on the first link, and communicate with the service provider over a third link and the first link at the available bandwidth wherein the third link connects the second user communication device and the first user communication device and wherein the third link is a different type of link than the first link.

2. The communication system of claim 1 wherein the second user communication device is further configured to:
establish the third link with the first user communication device responsive to the reply message.

3. The communication system of claim 1 wherein the first link and the second link comprise Digital Subscriber Line (DSL) service links.

4. The communication system of claim 1 wherein the third link comprises a wire line link.

5. The communication system of claim 3 wherein the third link comprises a wireless link.

6. The communication system of claim 1 wherein the first user communication device is further configured to:
determine the available bandwidth of the first link and indicate the available bandwidth to the second user communication device.

7. The communication system of claim 1 wherein the first user communication device is further configured to:
determine the available bandwidth of the first link and indicate the available bandwidth to the service provider.

8. The communication system of claim 1 wherein the first user communication device is further configured to:
generate a link sharing contract for the available bandwidth of the first link that specifies a type of link access to the first link.

9. The communication system of claim 8 wherein the link access comprises an interruptible access to the first link.

10. The communication system of claim 8 wherein the link access comprises a non-interruptible access to the first link.

11. The communication system of claim 8 wherein the service provider is configured to bill the second user communication device based on the link sharing contract.

12. The communication system of claim 8 wherein the service provider is configured to bill the first user communication device based on the link sharing contract.

13. A method of providing bandwidth sharing in a communication system, the method comprising:
in a first user communication device, communicating with a service provider over a first link; and
in a second user communication device:
communicating with the service provider over a second link wherein the second link does not include the first user communication device and wherein the first link does not include the second user communication device,
determining a need for additional bandwidth and transmitting a request for the additional bandwidth,
receiving an instruction message responsive to the request that grants the second communication device access to available bandwidth of the first link, and
communicating with the service provider over a third link and the first link at the available bandwidth wherein the third link connects the second user communication device and the first user communication device and wherein the third link is a different type of link than the first link.

14. The method of claim 13 further comprising:
in the second user communication device, establishing the third link with the first user communication device responsive to the instruction message.

15. The method of claim 13 wherein the first link and the second link comprise Digital Subscriber Line (DSL) service links.

16. The method of claim 13 wherein the third link comprises a wire line link.

17. The method of claim 15 wherein the third link comprises a wireless link.

18. The method of claim 13 further comprising:
in the first user communication device, determining the available bandwidth of the first link and indicating the available bandwidth to the second user communication device.

19. The method of claim 13 further comprising:
in the first user communication device, determining the available bandwidth of the first link and indicating the available bandwidth to the service provider.

20. The method of claim 13 further comprising:
in the first user communication device, generating a link sharing contact for the available bandwidth of the first link that specifies a type of link access to the first link.

21. The method of claim 20 wherein the link access comprises an interruptible access to the first link.

22. The method of claim 20 wherein the link access comprises a non-interruptible access to the first link.

23. The method of claim 20 further comprising:
in the service provider, billing the second user communication device based on the link sharing contract.

24. The method of claim 20 further comprising:
in the service provider, billing the first user communication device based on the link sharing contract.

25. A software product for use in a communication system that provides bandwidth sharing, the communication system comprised of a first user communication device, a second user communication device, and a service provider, the first user communication device configured to communicate with the service provider over a first link, the second user communication device configured to communicate with the service provider over a second link wherein the second link does not include the first user communication device and wherein the first link does not include the second user communication device, the software product comprising:
bandwidth sharing software configured when executed by a processing system in the second user communication system to:
determine a need for additional bandwidth and transmit a request for the additional bandwidth, receive an instruction message responsive to the request that grants the second user communication device access to available bandwidth on the first link, and communicate with the service provider over a third link and the first link at the available bandwidth wherein the third link connects the second user communication device and the first user communication device and wherein the third link is a different type of link than the first link; and storage media configured to store the bandwidth sharing software.

26. The software product of claim 25 wherein the bandwidth sharing software is further configured when executed by the processing system in the second user communication system to:

establish the third link with the first user communication device responsive to the instruction message.

27. The software product of claim 25 wherein the first link and the second link comprise Digital Subscriber Line (DSL) service links.

28. The software product of claim 25 wherein the third link comprises a wire line link.

29. The software product of claim 27 wherein the third link comprises a wireless link.

30. A communication system configured to provide bandwidth sharing, the communication system comprising:

a first user communication device configured to communicate with a service provider over a first link; and a second user communication device configured to communicate with a service provider over a second link wherein the second link does not include the first user communication device and wherein the first link does not include the second user communication device; and a service provider configured to determine a need to provide additional bandwidth to the second user communication device, determine available bandwidth on the first link, generate and transmit an instruction message responsive to the determination of the available bandwidth on the first link that grants the second user communication device access to the available bandwidth on the first link, the second user communication device further configured to receive the instruction message and communicate with the service provider over a third link and the first link at the available bandwidth responsive to the instruction message wherein the third link connects the second user communication device and the first user communication device and wherein the third link is a different type of link than the first link.

31. The communication system of claim 30 wherein the second user communication device is further configured to:

establish the third link with the first user communication device responsive to the reply message.

32. The communication system of claim 30 wherein the first link and the second link comprise Digital Subscriber Line (DSL) service links.

33. The communication system of claim 30 wherein the third link comprises a wire line link.

34. The communication system of claim 32 wherein the third link comprises a wireless link.

35. The communication system of claim 30 wherein the first user communication device is further configured to:

determine the available bandwidth of the first link and indicate the available bandwidth to the second user communication device.

36. The communication system of claim 30 wherein the first user communication device is further configured to:

determine the available bandwidth of the first link and indicate the available bandwidth to the service provider.

37. The communication system of claim 30 wherein the first user communication device is further configured to:

generate a link sharing contract for the available bandwidth of the first link that specifies a type of link access to the first link.

38. The communication system of claim 37 wherein the link access comprises an interruptible access to the first link.

39. The communication system of claim 37 wherein the link access comprises a non-interruptible access to the first link.

40. The communication system of claim 37 wherein the service provider is configured to:

bill the second user communication device based on the link sharing contract.

41. The communication system of claim 37 wherein the service provider is configured to:

bill the first user communication device based on the link sharing contract.

42. A method of providing bandwidth sharing in a communication system, the method comprising:

in a first user communication device, communicating with a service provider over a first link; and in a second user communication device, communicating with the service provider over a second link wherein the second link does not include the first user communication device and wherein the first link does not include the second user communication device; and in the service provider:

determining a need to provide additional bandwidth to the second user communication device, determine available bandwidth on the first link, generating and transmitting an instruction message responsive to the determination of the available bandwidth on the first link that grants the second user communication device access to the available bandwidth on the first link; and in the second user communication device, receiving the instruction message and communicating with the service provider over a third link and the first link at the available bandwidth responsive to the instruction message wherein the third link connects the second user communication device and the first user communication device and wherein the third link is a different type of link than the first link.

43. The method of claim 42 further comprising:

in the second user communication device, establishing the third link with the first user communication device responsive to the instruction message.

44. The method of claim 42 wherein the first link and the second link comprise Digital Subscriber Line (DSL) service links.

45. The method of claim 42 wherein the third link comprises a wire line link.

46. The method of claim 44 wherein the third link comprises a wireless link.

47. The method of claim 42 further comprising:

in the first user communication device, determining the available bandwidth of the first link and indicating the available bandwidth to the second user communication device.

48. The method of claim 42 further comprising:

in the first user communication device, determining the available bandwidth of the first link and indicating the available bandwidth to the service provider.

49. The method of claim 42 further comprising:
  in the first user communication device, generating a link sharing contract for the available bandwidth of the first link that specifies a type of link access to the first link.

50. The method of claim 49 wherein the link access comprises an interruptible access to the first link.

51. The method of claim 49 wherein the link access comprises a non-interruptible access to the first link.

52. The method of claim 49 further comprising:
  in the service provider, billing the second user communication device based on the link sharing contract.

53. The method of claim 49 further comprising:
  in the service provider, billing the first user communication device based on the link sharing contract.

54. A software product for use in a communication system that provides bandwidth sharing, the communication system comprised of a first user communication device, a second user communication device, and a service provider, the first user communication device configured to communicate with the service provider over a first link, the second user communication device configured to communicate with the service provider over a second link wherein the second link does not include the first user communication device and wherein the first link does not include the second user communication device, the software product comprising:
  bandwidth sharing software configured when executed by a processing system in the service provider to:
    determine a need to provide additional bandwidth to the second user communication device,
    determine available bandwidth on the first link,
    generate and transmit an instruction message responsive to the determination of the available bandwidth on the first link that grants the second user communication device access to the available bandwidth on the first link over a third link that connects the first user communication device and the second user communication device wherein the third link is a different type of link than the first link; and
  storage media configured to store bandwidth sharing software.

55. The software product of claim 54 wherein the first link and the second link comprise Digital Subscriber Line (DSL) service links and wherein the third link comprises a wireless link.

* * * * *